(12) United States Patent
Tang

(10) Patent No.: US 7,808,574 B2
(45) Date of Patent: Oct. 5, 2010

(54) LIQUID CRYSTAL DISPLAY DEVICE HAVING INTEGRAL RECEIVING BOX AND ASSEMBLY METHOD FOR SAME

(75) Inventor: Chih-Shun Tang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 198 days.

(21) Appl. No.: 12/218,363

(22) Filed: Jul. 14, 2008

(65) Prior Publication Data

US 2009/0015749 A1 Jan. 15, 2009

(30) Foreign Application Priority Data

Jul. 13, 2007 (CN) .................... 2007 1 0076012

(51) Int. Cl.
*G02F 1/1333* (2006.01)
*F21V 7/04* (2006.01)

(52) U.S. Cl. .................... 349/58; 362/632; 362/633; 362/634

(58) Field of Classification Search ............. 349/58–60; 362/632–634
See application file for complete search history.

(56) References Cited

U.S. PATENT DOCUMENTS

| 6,734,927 | B2 * | 5/2004 | Sato ............................ 349/58 |
| 6,762,806 | B1 * | 7/2004 | Matsuo et al. ................. 349/58 |
| 6,976,781 | B2 | 12/2005 | Chu et al. |
| 2006/0152647 | A1 * | 7/2006 | Han et al. ..................... 349/58 |

* cited by examiner

*Primary Examiner*—Michelle R Connelly Cushwa
(74) *Attorney, Agent, or Firm*—Wei Te Chung

(57) ABSTRACT

An exemplary liquid crystal display (LCD) device includes a liquid crystal panel, a backlight module parallel to the liquid crystal panel, and a receiving box. The receiving box includes a bezel and a back plate connected to the bezel. The back plate can rotate along a combination portion of the first bezel and the back plate. The bezel accommodates the liquid crystal panel and the backlight module. The back plate and the bezel fasten the liquid crystal panel and the backlight module. A related method for assembly of the LCD device is also provided.

16 Claims, 7 Drawing Sheets

LIQUID CRYSTAL DISPLAY DEVICE HAVING INTEGRAL RECEIVING BOX AND ASSEMBLY METHOD FOR SAME

FIELD OF THE INVENTION

The present invention relates to liquid crystal display (LCD) devices, and particularly to an LCD device having a receiving box and a method for assembly the LCD device.

GENERAL BACKGROUND

Because LCD devices have the advantages of portability, low power consumption, and low radiation, they have been widely used in various portable information products such as notebooks, personal digital assistants (PDAs), video cameras, and the like. The LCD device generally includes a liquid crystal panel, a backlight module, a bezel and a back plate. The bezel and the back plate engage to cooperatively contain the liquid crystal panel and the backlight module therebetween.

Referring to FIG. 7, a typical LCD device 1 includes a bezel 11, a liquid crystal panel 12, a backlight module 13 and a back plate 14. The backlight module 13 is disposed parallel to the liquid crystal panel 12, and provides planar light beams to the liquid crystal panel 12. The bezel 11 and the back plate 14 cooperatively receive and fix the liquid crystal panel 12 and the backlight module 13.

The backlight module 13 includes a frame 15, a light guide panel 16, and an optical film assembly 17. The frame 15 accommodates the light guide panel 16, the optical film assembly 17, and the liquid crystal panel 12.

The bezel 11 defines a window in a centre area thereof to expose an effective area (not labeled) of the liquid crystal panel 12 to viewers. A plurality of notches 110 are formed on edges of the bezel 11 and the back plate 14. The frame 15 includes a plurality of protrusions 120 corresponding to the notches 110 of the bezel 11 and the back plate 14 respectively. The protrusions 120 engage the notches 110 cooperatively to fix the bezel 11, the back plate 14, and the frame 15 together.

In a first step of assembly of the LCD device 1, the frame 15 engages the bezel 11 to fasten the liquid crystal panel 12. In a second step, the frame 15 engages the back plate 14 to fasten the backlight module 13. The engagement is realized by the protrusions 120 entering into the corresponding notches 110 of the bezel 11 and the back plate 14.

In assembly of the LCD device 1, the protrusions 120 and the notches 110 must be precisely positioned to engage each other. However, the positioning operation is time-consuming, and may result in inconvenience to the assembly process.

What is needed, therefore, is an LCD device and method for assembly thereof that can overcome the described limitations.

SUMMARY

In an exemplary embodiment, an LCD device includes a liquid crystal panel, a backlight module opposite to the liquid crystal panel, and a receiving box. The receiving box includes a bezel and a back plate connected to the bezel. The back plate can rotate along a combination portion of the first bezel and the back plate. The bezel accommodates the liquid crystal panel and the backlight module. The back plate together with the bezel cooperatively fastens the liquid crystal panel and the backlight module.

Other novel features and advantages of the present LCD device will become more apparent from the following detailed description when taken in conjunction with the accompanying drawings. In the drawings, all the views are schematic.

DETAILED DESCRIPTION OF PREFERRED EMBODIMENTS

Figure 1:
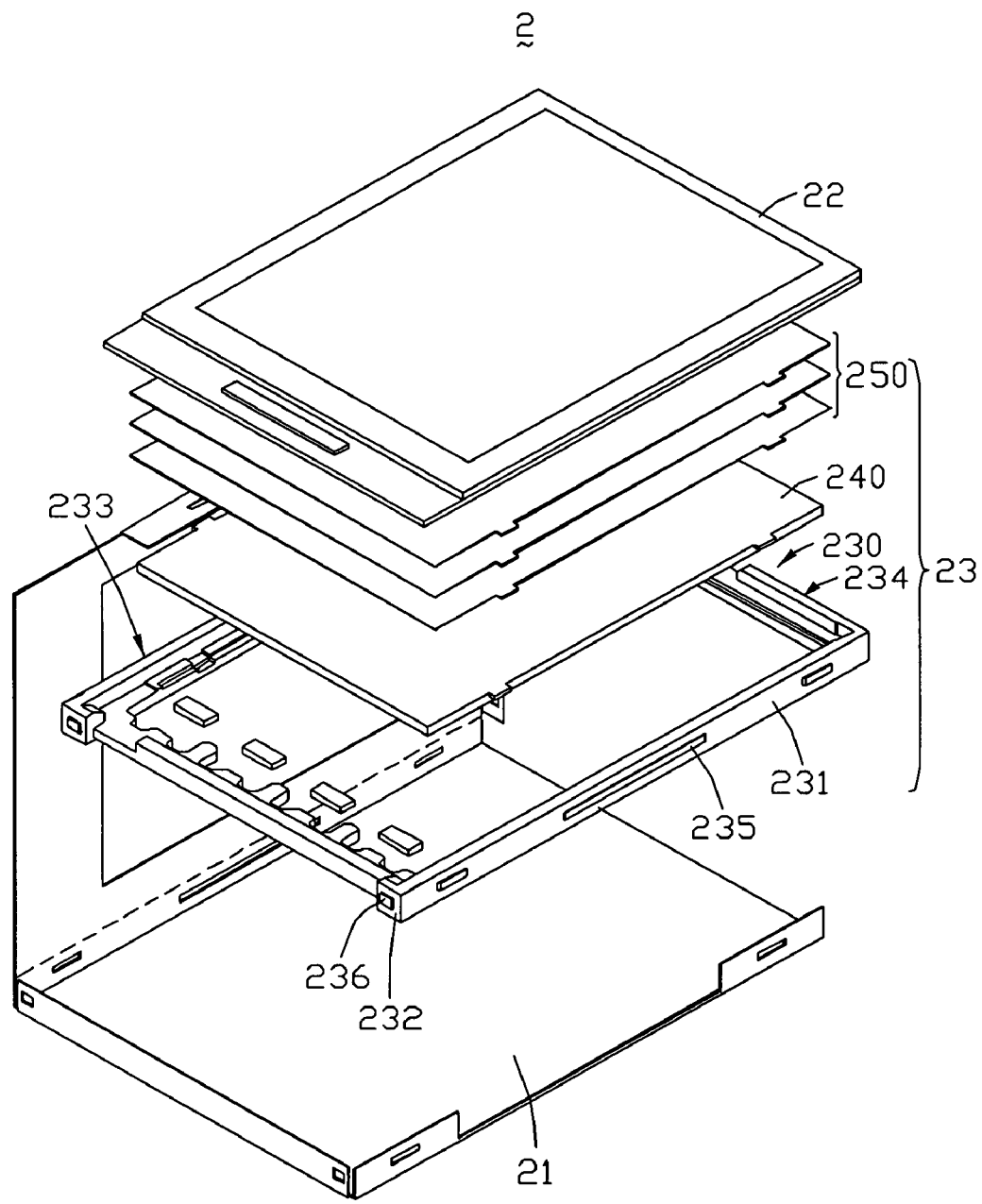
FIG. 1 is an exploded, isometric view of an LCD device according to a first embodiment of the present invention, the LCD device including a receiving box, a backlight module, and the liquid crystal panel.

Reference will now be made to the drawing figures to describe various embodiments of the present invention in detail.

Referring to FIG. 1, an LCD device 2 according to a first embodiment of the present invention includes a liquid crystal panel 22, a backlight module 23, and a receiving box 21. The backlight module 23 is disposed opposite and parallel to the liquid crystal panel 22, and is configured for providing uniform light for the liquid crystal panel 22. The backlight module 23 includes a frame 230, a light guide panel 240, and an optical film assembly 250. When the LCD device 2 is assembled, the frame 230 receives the light guide panel 240, the optical film assembly 250, and the liquid crystal panel 22 in that order. The receiving box 21 accommodates the backlight module 23 and the liquid crystal panel 22.

The frame 230 includes four sidewalls (not labeled) connected end to end. Outside surfaces of the sidewalls are defined as a first outside surface 231, a second outside surface 232, a third outside surface 233 opposite to the first outside surface 231, and a fourth outside surface 234 opposite to the second outside surface 232. The first outside surface 231 and the third outside surface 233 each constitute three first protrusions 235 extending outwardly therefrom. The three first protrusions 235 are substantially colinear. Each first protrusion 235 arranged in a middle portion of the first outside surface 231 and the third outside surface 233 is longer than the first protrusions 235 arranged at two sides of each of the first outside surface 231 and the third outside surface 233. Two second protrusions 236 extend outwardly from each of the second outside surface 232 and the fourth outside surface 234 respectively. The second protrusions 236 are formed at ends of the second and the fourth outside surfaces 232, 234. The first and the second protrusions 235, 236 are rectangular in profile.

Figure 2:
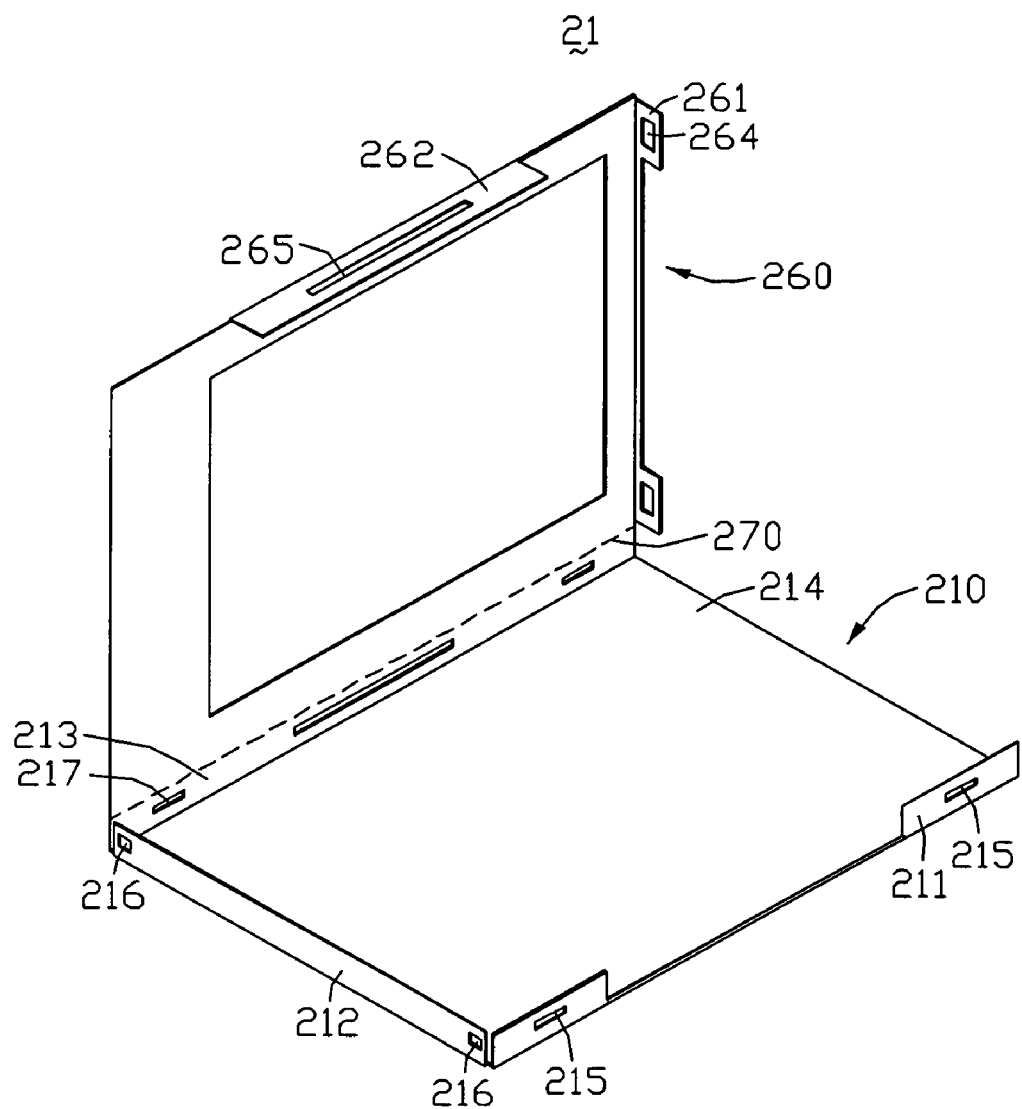
FIG. 2 is an isometric view of the receiving box of FIG. 1, the receiving box including a bezel and a back plate.

Referring also to FIG. 2, the receiving box 21 includes a bezel 210 and back plate 260 integrally connected to the bezel 210 to form a one-piece body. The bezel 210 includes a tray 214, and three sidewalls extending perpendicularly from three edges of the tray 214. The three sidewalls are defined as a first sidewall 211, a second sidewall 212, and a third sidewall 213. The first sidewall 211 is connected to one end of the second sidewall 212, and the third sidewall 213 is connected to the other end of the second sidewall 212. A fourth edge of the tray 214 defines an insertion port (not labeled).

The first sidewall 211 includes an opening defined in a middle thereof, and two first notches 215 at each side of the first sidewall 211 respectively. The two first notches 215 correspond to the two first protrusions 235 of the first outside surface 231 of the frame 230. The second sidewall 212 includes two second notches 216 respectively defined at end portions thereof. The two second notches 216 correspond to the two second protrusions 236 of the second outside surface 232 of the frame 230, respectively. The third sidewall 213 includes three third notches 217, the three third notches 217 corresponding to the three protrusions 235 of the third outside surface 233 of the frame 230, respectively.

The back plate 260 includes a window in a centre area to expose an active area (not labeled) of the liquid crystal panel 22. One edge of the back plate 260 is connected to the third sidewall 213 of the bezel 210. The back plate 260 further includes a fourth sidewall 261 and a fifth sidewall 262. The fourth sidewall 261 has an opening (not labeled) in a middle portion thereof, and a fourth notch 264 at each end thereof. The fourth notches 264 correspond to the two second protrusions 236 of the fourth outside surface 234 of the frame 230. The fifth sidewall 262 is substantially the same size as the opening of the first sidewall 211 of the bezel 210. The fifth sidewall 262 has a fifth notch 265 corresponding to the middle first protrusion 235 of the first sidewall 231 of the bezel 210.

The receiving box 21 is metal such as iron, aluminum or an alloy. The bezel 210 and the back plate 260 are integrated to form a one-piece body. The back plate 260 can rotate along a combination portion of the first and back plates 210, 260.

Figure 3:
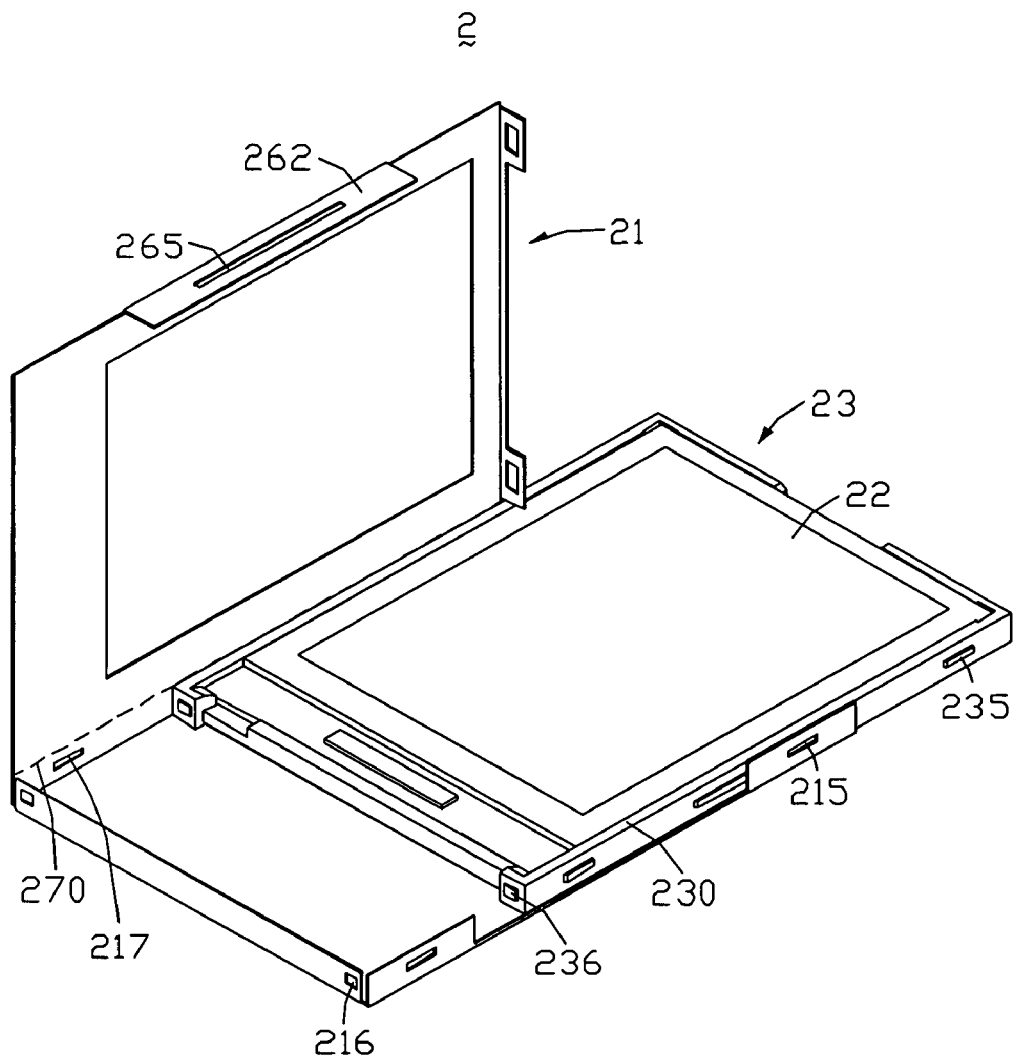
FIGS. 3-4 are isometric views showing an assembly process of the LCD device of FIG. 1, with FIG. 3 showing the backlight module and the liquid crystal panel inserted into the receiving box from one side, and FIG. 4, the backlight module and the liquid crystal panel being fastened to the back plate.
Figure 4:
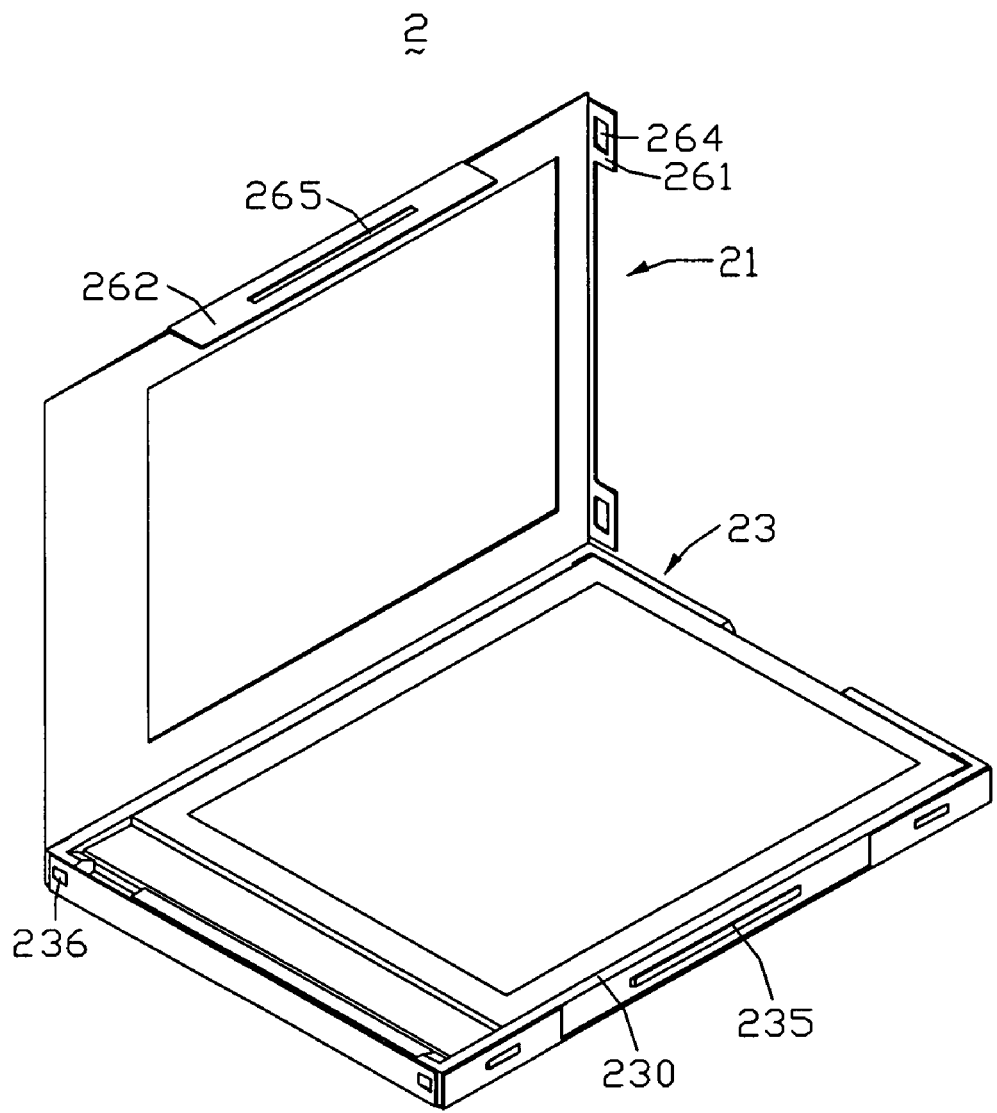
Figure 5:
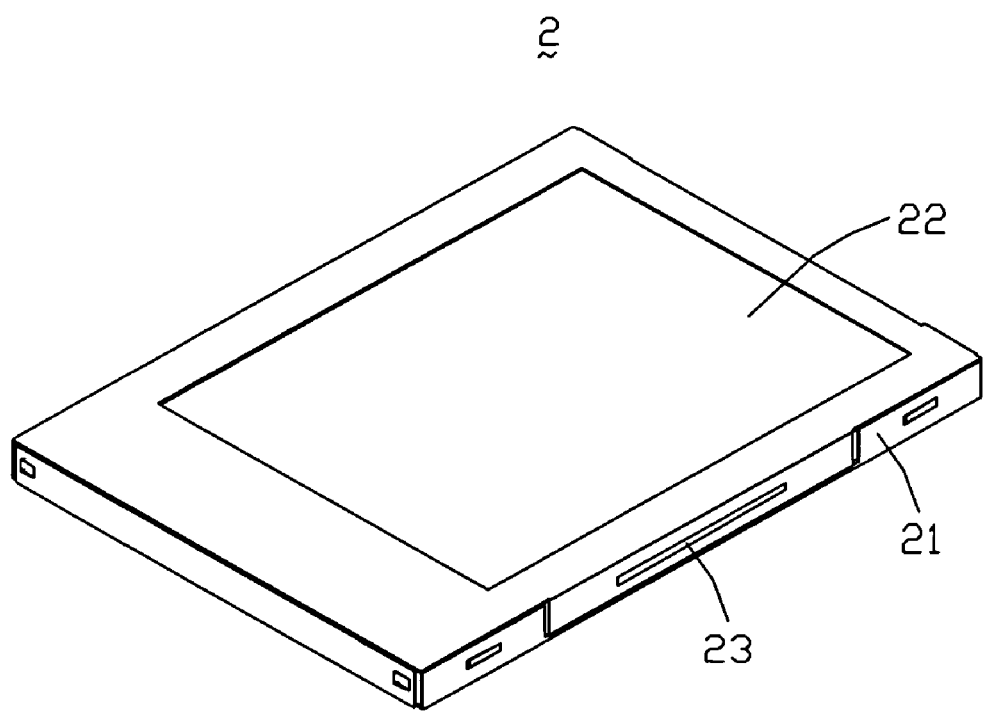
FIG. 5 is an assembled view of the LCD device of FIG. 1.

Referring also to FIGS. 3-5, an assembly process of the LCD device 2 is illustrated in FIGS. 3-4, and an assembled LCD device 2 is shown in FIG. 5. Detailed steps of the assembly of the LCD device 2 follow. In a first step, the light guide panel 240, the optical film assembly 250, and the liquid crystal panel 22 are received in the frame 230, the liquid crystal panel 22 facing the back plate 260. In a second step, the second sidewall 232 of the frame 230 faces the opening of the bezel 210 where no sidewall is formed, and the frame 230 is inserted into the bezel 210 until fully accommodated thereby. At this time, the two first protrusions 235 of the two sides of the first outside surface 231, the second protrusions 236 of the second outside surface 232, and the three first protrusions 235 of the third outside surface 233 enter into the corresponding two first notches 215 of the first sidewall 211, two second notches 216 of the second sidewall 212, and the three third notches 217 of the third sidewall 213 respectively. Thus, the frame 230 engages the bezel 210. In a third step, the back plate 260 is rotated along the combination line toward the bezel 210 to close the receiving box 21. At this time, the second protrusion 236 of the fourth sidewall 234 enters into the fourth notches 264 of the fourth sidewall 261. The middle first protrusion 235 is inserted into the fifth notch 265 of the sixth sidewall 262. Thus, the backlight module 23 and the liquid crystal panel 22 are received and fastened in the receiving box 21.

Unlike conventional LCD devices, the LCD device 2 includes receiving box 21 which is integrally formed into a one-piece body by the bezel 210 and the back plate 260, instead of a bezel and a back plate separated from each other. The receiving box 21 includes the bezel 210 and the back plate 260 connected to each other, and the back plate 260 can be rotated along the combination portion 270. When the receiving box 21 is closed, the backlight module 23 and the liquid crystal panel 22 are received and fastened in the receiving box 21. The protrusions 235, 236 are easily engaged with the corresponding notches 215, 216, 217, 264 and 265 without the requirement for precise positioning thereof. Thus, the assembly process of the LCD device 2 is convenient.

Figure 6:
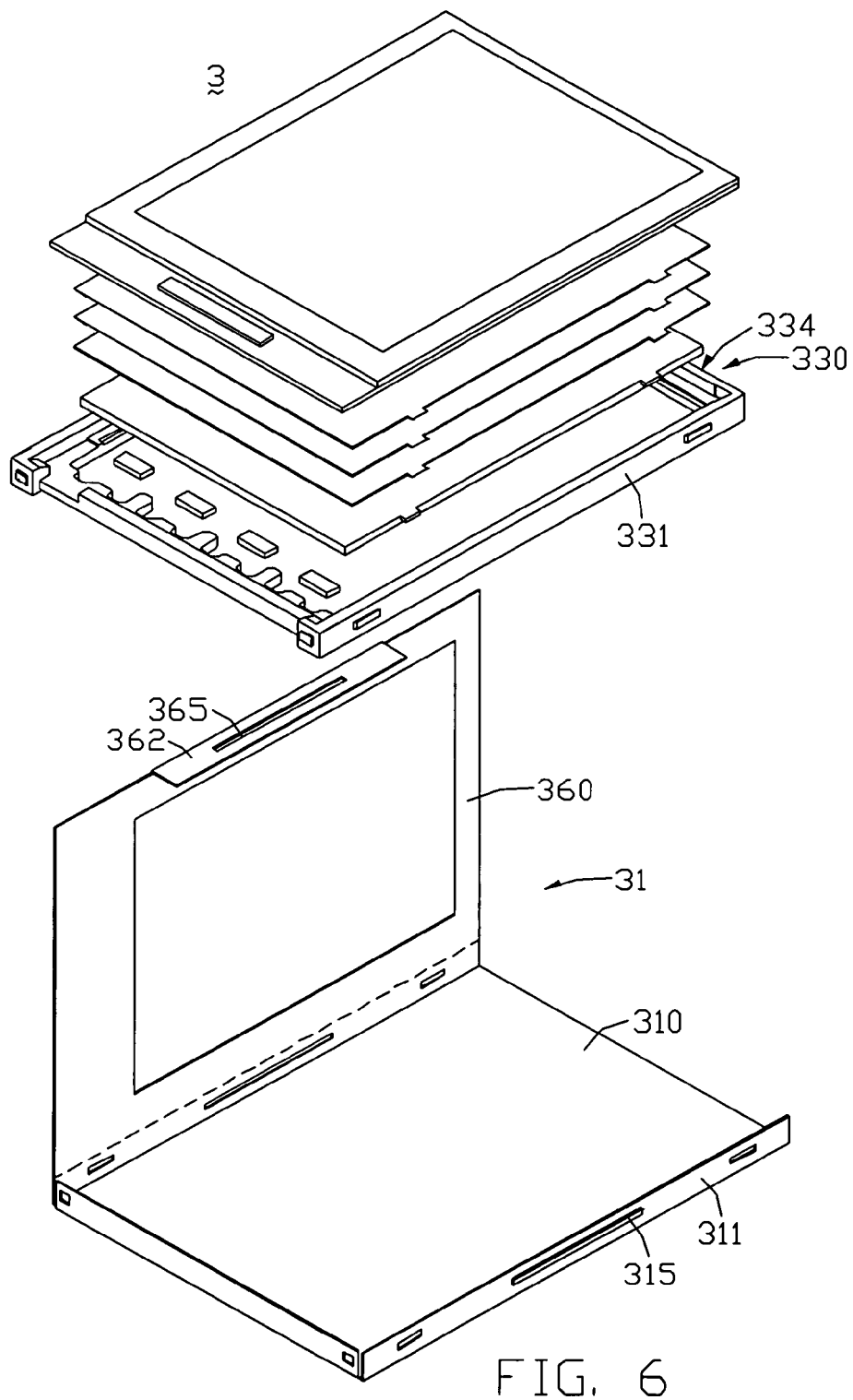
FIG. 6 is similar to FIG. 1, being an isometric view of an LCD device according to a second embodiment of the present invention.
Figure 7:
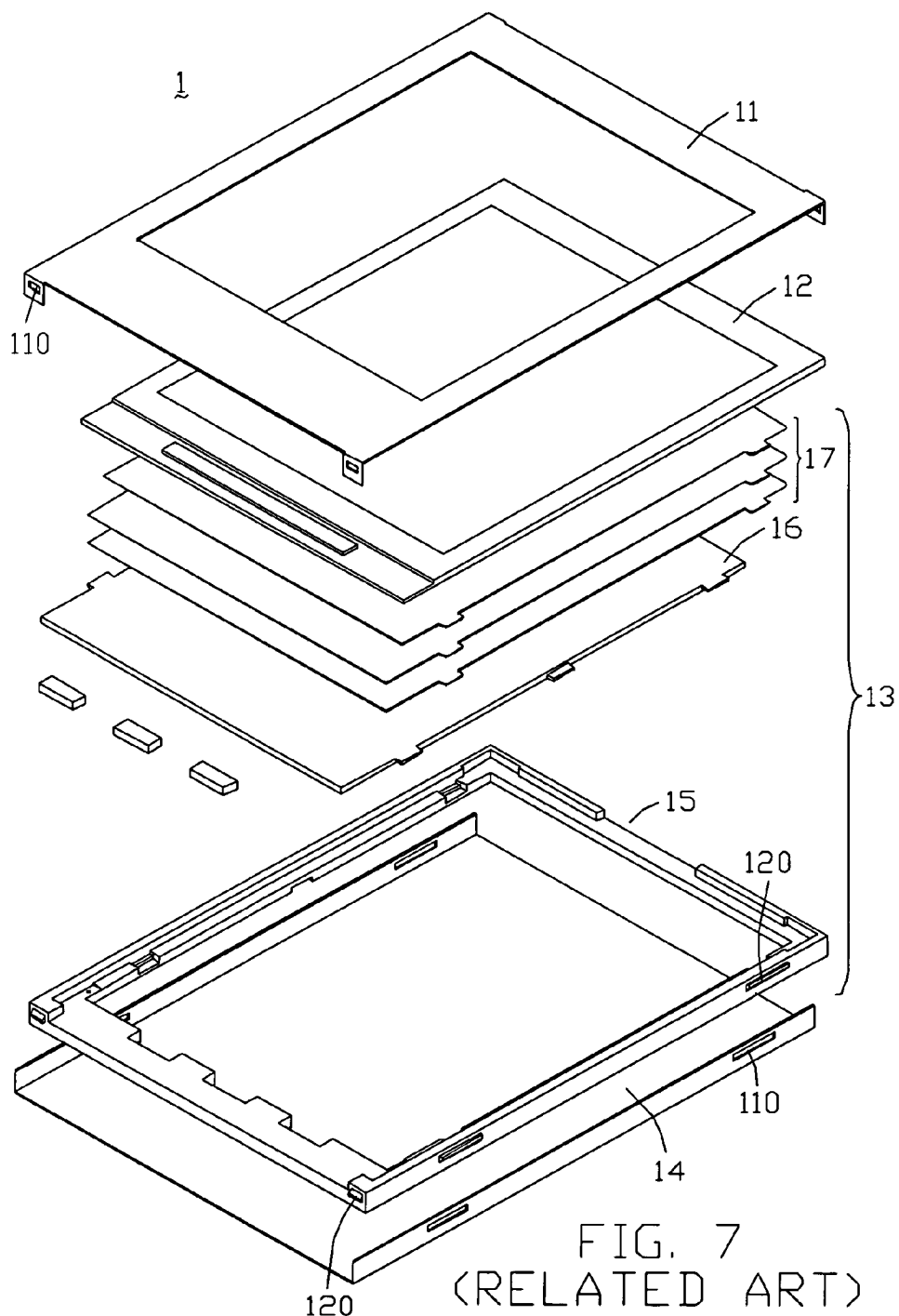
FIG. 7 is an exploded, isometric view of a conventional LCD device.

Referring to FIG. 6, an exploded, isometric view of an LCD device according to a second embodiment of the present invention is shown. The LCD device 3 is similar to the LCD device 2, differing only in that a back plate 360 of a receiving box 31 does not include a fourth sidewall, a first outside surface 331 of a frame 330 does not include a first protrusion in the middle position thereof, and a fourth outside surface 334 does not include second protrusions. A first sidewall 311 of the bezel 310 does not include an opening in the middle portion, rather, the first sidewall 311 includes a sixth protrusion 315 in the middle position thereof. During assembly, the frame 33 engages the bezel 310 firstly. Then, the back plate 360 engages the bezel 310 by inserting the sixth protrusion 315 of the bezel 310 into a fifth notch 365 of a fifth sidewall 362 of the back plate 360. The LCD device 3 has advantages similar to those of the LCD device 2.

Further and/or alternative embodiments are described as follows. An LCD device according to a third embodiment is similar to the LCD device 2, differing only in that a back plate does not have a window for exposing an active area of a liquid crystal panel. Rather, a tray of the bezel defines the window. during assembly, a frame which receives the liquid crystal panel, an optical film assembly and a light guide panel is inserted into the bezel from one side, the liquid crystal panel facing the window of the tray of the bezel. An LCD device according to a fourth embodiment is similar to the LCD device 2, differing in that the bezel does not have a second sidewall, the back plate does not have a fourth sidewall, and correspondingly the frame does not have second protrusions. That is, the frame only has first protrusions of a first outside surface and a third outside surface. An LCD device according to a fifth embodiment is similar to the LCD device 2, differing in that the bezel and back plate can be connected by a hinge so that the back plate can rotate along the hinge forward or backward to the bezel.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display (LCD) device, comprising:
   a liquid crystal panel;
   a backlight module opposite to the liquid crystal panel; and
   a receiving box, the receiving box comprising a bezel and
      a back plate connected to the bezel, the back plate being operable to rotate along a combination portion of the bezel and the back plate, the bezel accommodating the liquid crystal panel and the backlight module, the bezel defining an opening in an edge thereof for the backlight module and the liquid crystal panel inserting into the bezel, the back plate together with the bezel cooperatively fastening the liquid crystal panel and the backlight module.

2. The LCD device of claim 1, wherein the bezel comprises a tray, one selected member of the tray and the back plate comprising an opening to expose an active area of the liquid crystal panel.

3. The LCD device of claim 2, wherein the bezel comprises a first sidewall, a second sidewall, and a third sidewall, the first sidewall and the third sidewall being connected to two ends of the second sidewall respectively, and the back plate being connected to the third sidewall.

4. The LCD device of claim 3, wherein the backlight module comprises a frame, the frame receiving an optical film assembly, a light guide panel, and the liquid crystal panel.

5. The LCD device of claim 4, wherein the frame comprises four outside surfaces.

6. The LCD device of claim 5, wherein the three sidewalls of the bezel comprise at least one first notch, the outside surfaces of the frame comprising at least one first protrusion corresponding to the at least one first notch, the at least one first protrusion engaging the at least one first notch to fasten the frame to the bezel.

7. The LCD device of claim 6, wherein the back plate comprises at least one fourth sidewall, the at least one fourth sidewall comprising at least one second notch, the three sidewalls of the bezel or the four outside surfaces of the frame comprising at least one second protrusion corresponding to the at least one second notch, and the at least one second protrusion engaging the at least one second notch to fasten the liquid crystal panel and the backlight module.

8. The LCD device of claim 1, wherein the receiving box is integrally manufactured, the bezel and the back plate comprising a one-piece body.

9. The LCD device of claim 1, wherein the receiving box is iron, aluminum or an alloy thereof.

10. A liquid crystal display device, comprising:
   a liquid crystal panel;
   a backlight module opposite to the liquid crystal panel; and
   a receiving box, the receiving box comprising a bezel and a back plate connected to the bezel to form a one-piece body, the back plate being rotatable along a combination portion of the bezel and back plate so that the back plate is able to engage to the bezel, the bezel defining an opening in an edge thereof for the backlight module and the liquid crystal panel inserting into the bezel, the receiving box accommodating and fastening the liquid crystal panel and the backlight module therein.

11. A method for assembling the LCD device of claim 1, the method comprising:
   fixing the liquid crystal panel and the backlight module into the bezel; and
   rotating the back plate to engage with the bezel so as to fasten the liquid crystal panel and the backlight module in the receiving box.

12. The method of claim 11, wherein the backlight module comprises a frame, an optical film assembly, and a light guide panel, and the frame receives the optical film assembly, the light guide panel, and the liquid crystal panel.

13. The method of claim 12, wherein the frame comprises four sidewalls, the four sidewalls define four outside surfaces, at least one of the four outside surfaces comprises at least one first protrusion extending therefrom, and the bezel comprises at least one first notch corresponding to the at least one first protrusion.

14. The method of claim 13, wherein the frame receiving the optical film assembly, the light guide panel, and the liquid crystal panel is inserted into the bezel, and the frame engages the bezel.

15. The method of claim 14, wherein the back plate comprises at least one second notch, and the frame or the bezel comprises at least one second protrusion corresponding to the at least second notch.

16. The method of claim 15, wherein the back plate is rotated toward the bezel such that the at least one second protrusion engages the at least one second notch, so as to fasten the liquid crystal panel and the backlight module in the receiving box.

* * * * *